Figure 1:
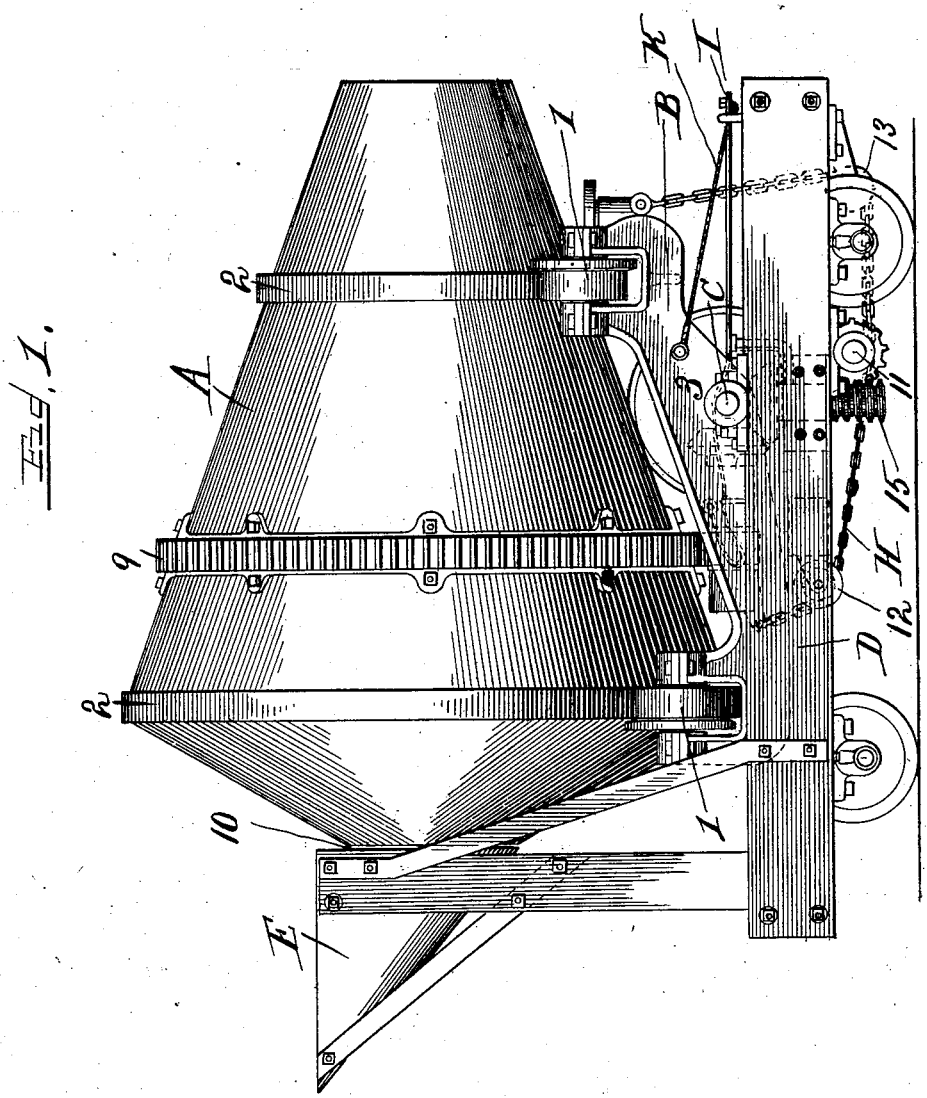

No. 703,424. Patented July 1, 1902.
W. J. JUDD.
ROTARY MIXER FOR CONCRETE, &c.
(Application filed Aug. 8, 1901.)
(No Model.) 6 Sheets—Sheet 1.

Witnesses
J H Glendening
D O Tauberschmidt

Inventor
William J. Judd
by Chas. G. Page Atty

No. 703,424. Patented July 1, 1902.
W. J. JUDD.
ROTARY MIXER FOR CONCRETE, &c.
(Application filed Aug. 8, 1901.)

(No Model.) 6 Sheets—Sheet 4.

Witnesses
J. H. Glendening
G. A. Raubenschmidt

Inventor
William J. Judd
by Chas. G. Page Atty

No. 703,424. Patented July 1, 1902.
W. J. JUDD.
ROTARY MIXER FOR CONCRETE, &c.
(Application filed Aug. 8, 1901.)
(No Model.) 6 Sheets—Sheet 5.

Witnesses
J. H. Glendening
G. A. Nauberschmitt

Inventor
William J. Judd
by Chas. G. Page Atty

No. 703,424. Patented July 1, 1902.
W. J. JUDD.
ROTARY MIXER FOR CONCRETE, &c.
(Application filed Aug. 8, 1901.)
(No Model.) 6 Sheets—Sheet 6.
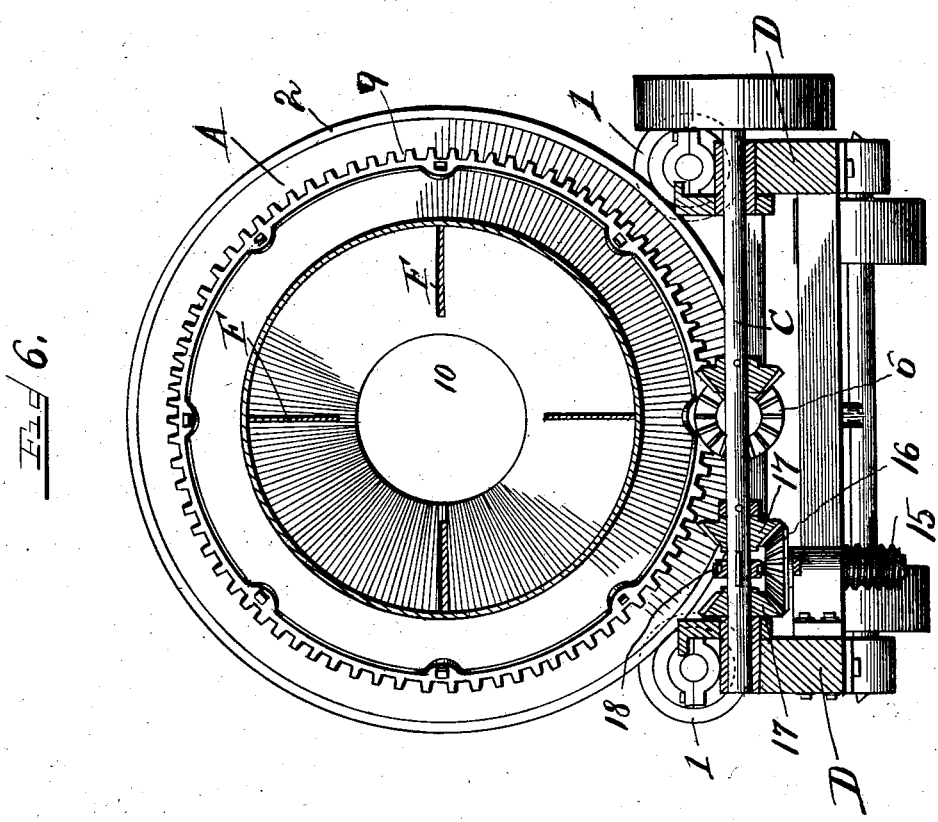
Witnesses
J. H. Glendening
I. A. Nauberschmidt
Inventor
William J. Judd
by Chas. G. Page Atty

UNITED STATES PATENT OFFICE.

WILLIAM J. JUDD, OF NEW YORK, N. Y., ASSIGNOR TO FREDERICK C. AUSTIN, OF CHICAGO, ILLINOIS.

ROTARY MIXER FOR CONCRETE, &c.

SPECIFICATION forming part of Letters Patent No. 703,424, dated July 1, 1902.

Application filed August 8, 1901. Serial No. 71,323. (No model.)

*To all whom it may concern:*

Be it known that I, WILLIAM J. JUDD, a citizen of the United States, residing at New York, in the county of New York and State of New York, have invented a certain new and useful Improvement in Rotary Mixers for Concrete and other Substances, of which the following is a specification.

My invention relates to mixers for concrete and the like of the kind involving a rotary mixing-drum provided at opposite ends with charging and discharge openings, a tilting frame supporting the rotary mixing-drum and in turn supported by trunnions upon a stationary frame, antifriction-rolls arranged between the tilting frame and the rotary mixing-drum, a device for actuating the tilting frame, and driving-gear engaging a ring-gear arranged upon and between the ends of the rotary mixing-drum, whereby the latter can be continuously rotated, whether in a receiving or discharging position and while being tilted, an illustration of a mixer thus constructed being afforded, for example, by British patent to Day and Lampart, No. 441 of 1878.

Objects of my invention are to utilize the power employed for driving the drum as a means for tilting the latter, to automatically arrest the tilting action of the drum at the two extremes of its desired tilting movement, to tilt the drum into position to receive from a stationary hopper, and to reversely tilt the drum so as to bring it into position to permit it to freely discharge its contents, to provide the drum with mixing-blades adapted to form straight slides for the purpose of freely discharging its contents when it is brought into dumping position, and to provide novel and improved means for supporting and operating the drum so as to facilitate the discharge, to more effectively support the drum, and to attain certain further advantages, as will hereinafter appear.

Figure 2:
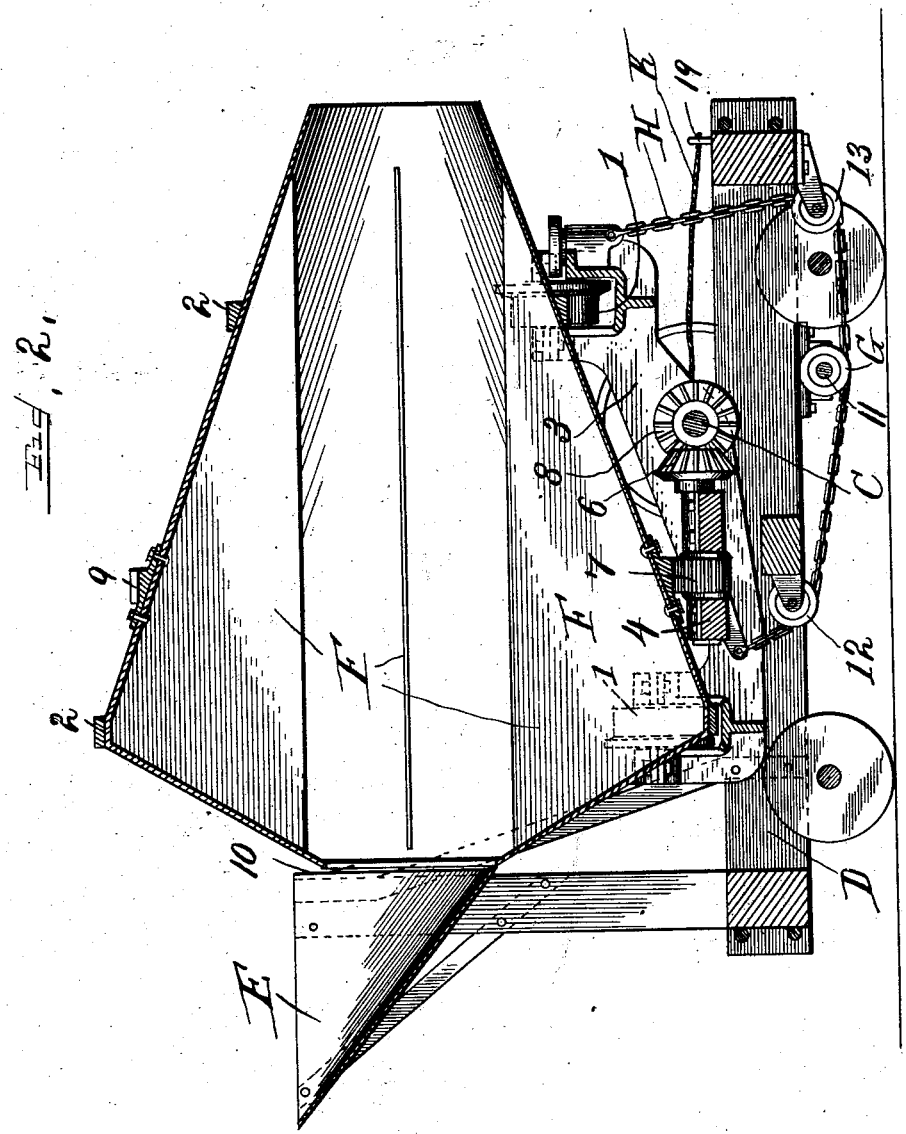
Figure 3:
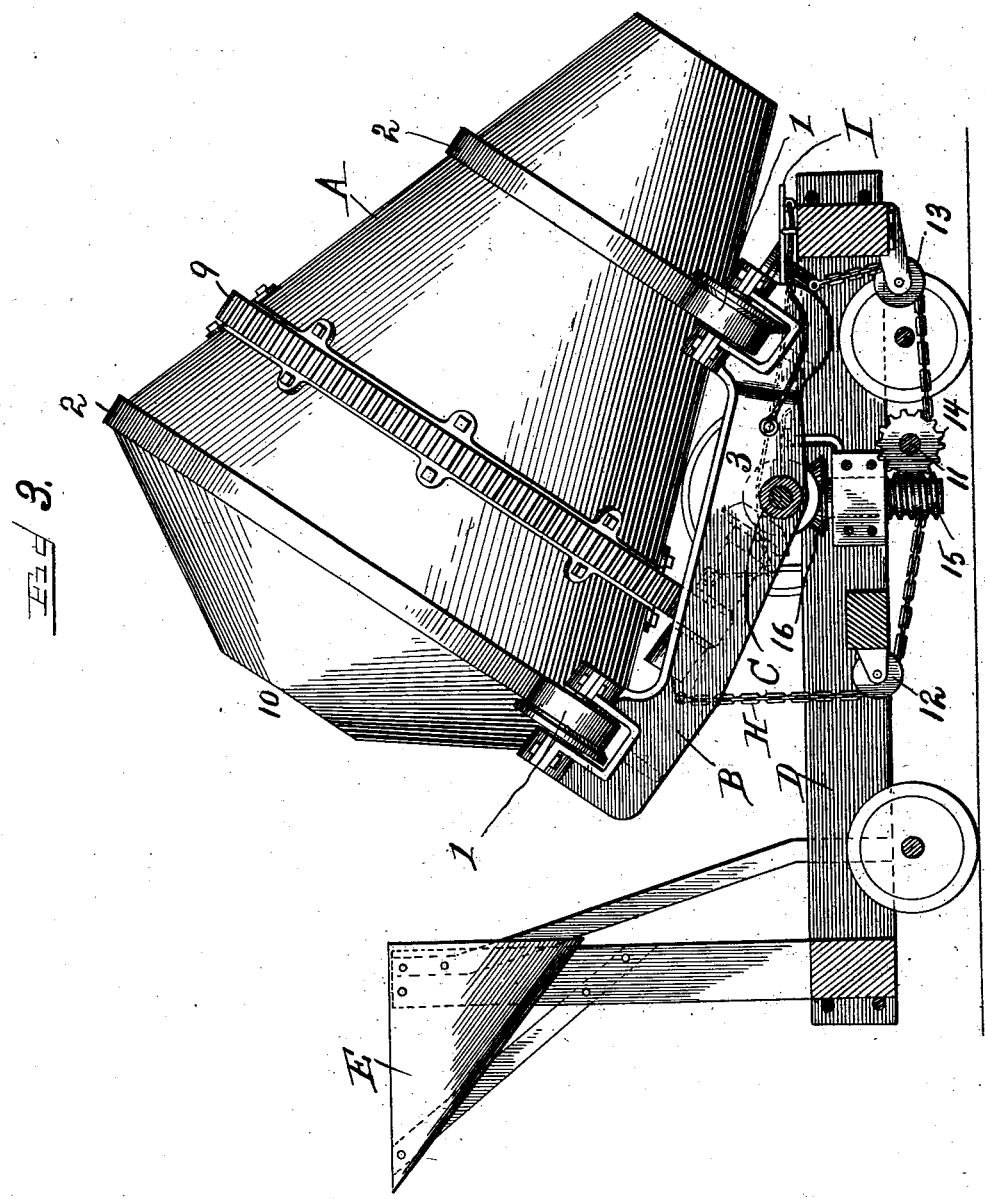
Figure 4:
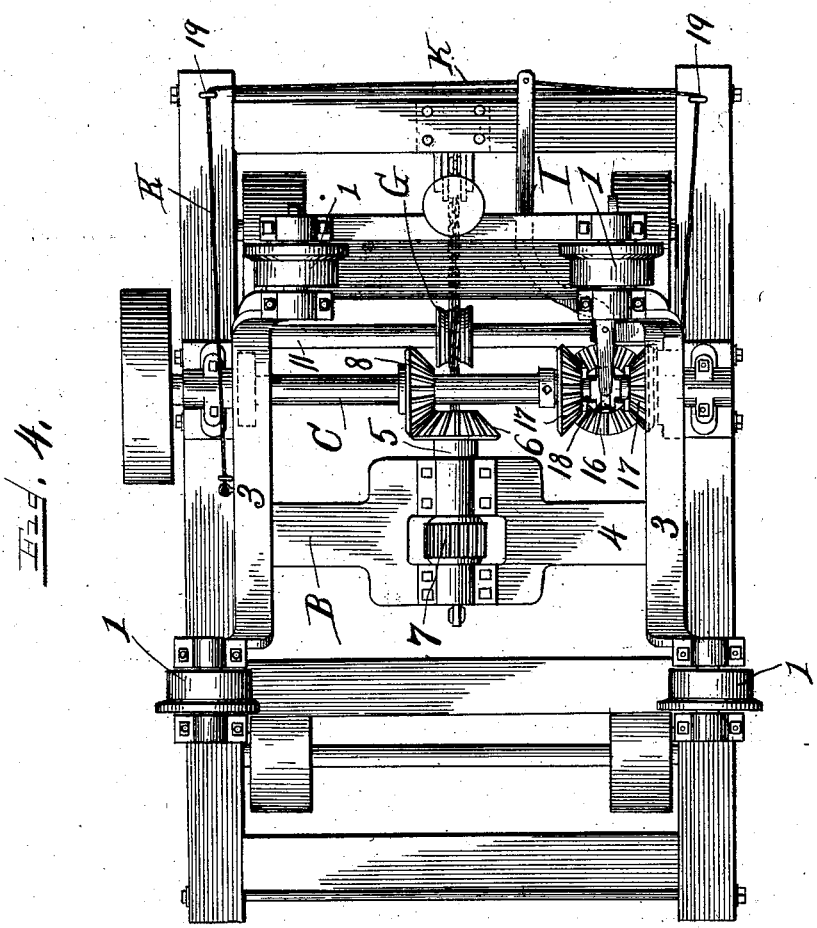
Figure 5:
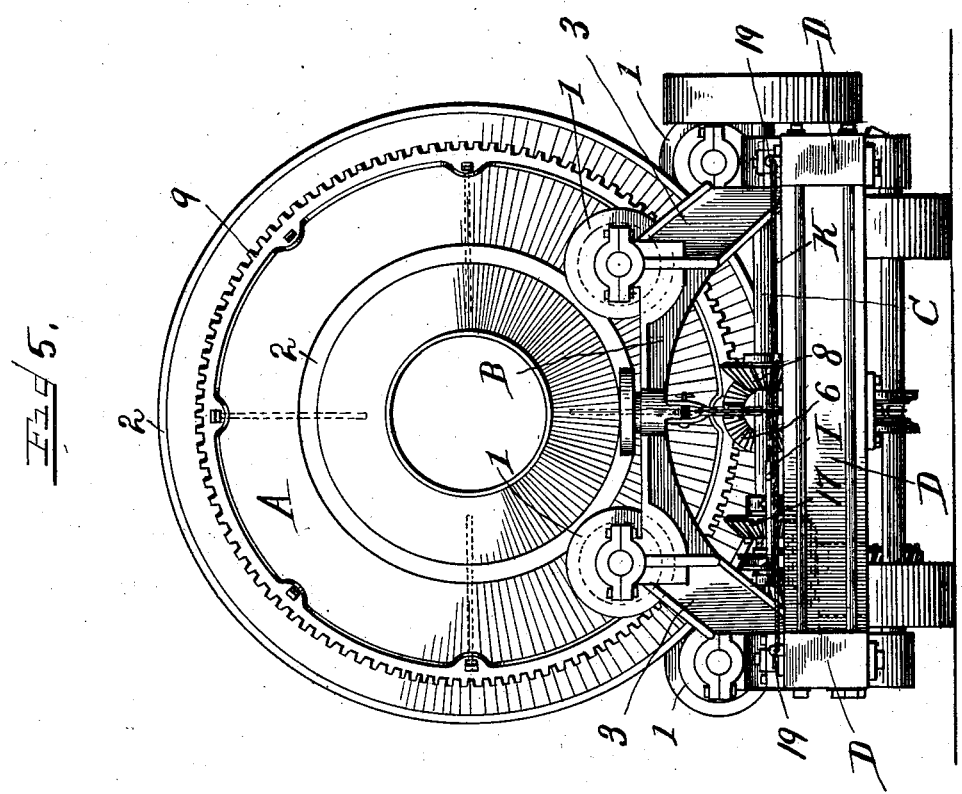

In the accompanying drawings, Figure 1 is a side elevation of a mixer embodying the principles of my invention. Fig. 2 is a longitudinal section on a vertical central plane. Fig. 3 shows the mixer, partly in side elevation and partly in central vertical section, with the drum in a tilted position. Fig. 4 is a top plan view with the drum removed. Fig. 5 is an end view of the mixer. Fig. 6 is a transverse section.

The rotary drum A forms a mixing-chamber which is open at one end to receive the materials that are to be mixed and open at its opposite end to discharge the mixture. This rotary drum is supported to tilt about a horizontal axis transverse to the axis about which the drum revolves, to the end that the drum may be positioned to retard or temporarily arrest the discharge, or tilted so as to rapidly discharge a batch of thoroughly-mixed substances. The drum contracts or tapers toward its discharge end, so that when it is in position to elevate such discharge end, as in Figs. 1 and 2, it will form a receptacle in which a "batch" can be temporarily retained and thoroughly admixed, while, on the other hand, when the drum is tilted, as in Fig. 3, the mixing-chamber will be converted into a passage which inclines downwardly toward its discharge end.

The drum is essentially a conical structure in order to permit the attainment of the foregoing-mentioned ends, it being preferable, however, to taper its receiving-end portion toward the inlet, thereby forming a double-tapered or double-conical drum, tapering toward opposite ends and desirably composed of a long conical portion forming the main length of the drum and a short conical portion which forms the receiving-end part of the structure, as illustrated.

The rotary drum A is arranged upon a tilting support B, which can be adjusted so as to elevate and depress the discharge end of the drum according to requirements, and to reduce friction, the tilting support carries a set of antifriction-rolls *l*, which engage annular tracks or ways 2 on the drum and serve as roller-bearings for the latter. Each of these tracks or ways is preferably engaged by a pair of such rolls, one pair being arranged to support the drum along the line of junction between the long and short cones, while the remaining rolls are arranged to support the drum at points farther forward.

The tilting support B is in the nature of a rocking frame having side portions 3, which are connected together and braced by suitably-arranged intervening cross portions and provided with bearing-rolls 1, as shown, for example, in Figs. 3 and 4.

The drum is operated from a rotary driving-shaft C through the medium of a suitable power-transmitting connection, and the tilting support B for the drum is arranged to tilt about the axis of such shaft. This rotary driving-shaft is therefore arranged below the drum and transverse to the axis about which the drum revolves, the support for the driving-shaft being a suitably-wheeled truck-frame D, which can be readily transported from place to place, as may be required.

As a means for operating the drum from the rotary driving-shaft the cross portion 4 of the tilting frame carries a short rotary shaft or spindle 5, arranged parallel with the axis of the drum and provided with gear-wheels 6 and 7, the former meshing with a gear 8 on the shaft C and the latter meshing with an annular rack or ring-gear 9 on the drum. By this arrangement the gear-wheel 7 can be placed centrally under the drum and midway between the sides of the tilting frame upon which the drum is supported, and by arranging the tilting frame to tilt about the axis of shaft C, as best illustrated in Fig. 3, such frame can be tilted without breaking mesh between the gears 6 and 8.

The materials can be directed into the open receiving end 10 of the drum by a chute or hopper E, which is supported upon the truck. This hopper may be fixed, or it can be adjustably secured so as to vary its position with reference to the position of the drum.

The rotary mixing-drum contains an annular series of longitudinally-extending shelves F, Figs. 2 and 6, which project laterally inward from the inner wall of the drum. These shelves extend nearly or substantially the length of the drum and are preferably in planes coincident with the axis about which the drum revolves. When the drum is revolved, the material therein will be successively carried up by and thrown off from these shelves, and when thus thrown off the material will have a direct fall, which serves to effectively break up all cement or mortar balls that may have been formed and also to rapidly and effectively mix together the ingredients.

When the mixing-drum is in the position shown in Figs. 1 and 2, a batch of concrete or the like can be mixed by suitably rotating the drum containing the required ingredients, and by then tilting the drum into the position shown in Fig. 3 the entire batch can be speedily discharged without arresting the rotary action of the drum. On the other hand, the drum can in the first instance be tilted so as to insure a slow steady movement of the material from its receiving end to and out through its delivery end, and by blocking or holding the drum in such position and adjusting the hopper or otherwise providing for feed into the drum the operation of mixing and discharge can be rendered continuous.

In order to facilitate the operation of successively mixing up and discharging batches of concrete or the like and to render such operation or succession of operations as nearly continuous as possible and also to automatically position the mixing-drum both for receiving and for ultimately discharging materials, I employ the driving power which serves to rotate the mixing-drum as a power for also tilting it, and in this connection I provide means whereby when the drum is tilted in one direction its tilting action will be automatically arrested at a time proper for the discharge of its contents and also whereby when the drum is tilted in an opposite direction such tilting action will be automatically arrested, when the drum is in position to again receive materials. To such ends the machine is provided with a chain-drum G, Fig. 4, secured to a rotary shaft 11 on the truck-frame, and a chain H, Figs. 1, 3, 4, is carried about such drum and extended in opposite directions therefrom, so as to permit one end of the chain to be attached to one end portion of the tilting frame B and allow the other end of such chain to be attached to the opposite end portion of said tilting frame. The chain is thus connected with the tilting frame at opposite sides of the axis about which such frame is arranged to tilt and is carried about an intervening chain-drum or sprocket, which can be rotated either way for the purpose of tilting the frame. In order to guide the chain, it passes under pulleys 12 and 13 on the truck-frame, as best shown in Figs. 1 and 3. The rotary shaft 11 is provided with a worm-wheel 14, which engages with a short upright rotary worm-shaft 15, supported by the truck-frame. This worm-shaft has its upper end provided with a bevel-gear 16, which is in constant mesh with a couple of oppositely-arranged bevel-gears 17, normally loose upon the rotary driving-shaft C. The shaft C carries a clutch member 18, (see Fig. 6,) which is keyed to slide along but rotate with the shaft. This clutch member is operated by a clutch-lever I, which can be swung so as to throw the clutch member 18 into engagement with either of the gears 17, by which arrangement the worm-shaft can be connected with and disconnected from the driving-shaft and also be caused to revolve in one or the other direction, according to which one of the gears 17 is placed in clutch with the driving-shaft. The lever I could be manually operated to both start and arrest the tilting action of the rocking or tilting frame which supports the mixing-drum; but in order to automatically arrest such tilting action at proper times a cord K or the like can be attached to the clutch-lever I and carried therefrom through guides or eyes 19 on the truck-frame and thence to the tilting-frame, to which latter one end of the cord can be attached at one side of the axis about which it tilts, while the other end of the cord can be attached to said frame at the opposite side of such axis. When therefore the frame is tilted in a way to cause a discharge from the hopper, the portion of the cord at one side of the clutch-lever will slacken up, while at a proper moment the portion of the cord at the opposite side of the clutch-lever will be drawn taut to an extent to move the lever in a direction to shift the clutch and disconnect the driving power from the tilting frame. After dumping the contents of the drum an operator can swing the lever in a direction, connect the driving power with the tilting frame in a way to cause the latter to tilt the drum into its first position, and upon reaching such position the lever will again be automatically operated by the cord in a way to disconnect the driving power from the tilting frame. Various mechanical means can obviously be employed in lieu of the cord arrangement shown for automatically tripping or shifting a clutch mechanism employed to connect and disconnect the driving power which revolves the drum with and from means for tilting the latter.

By providing the drum with internally-arranged shelves, as hereinbefore mentioned, materials within the drum will be thoroughly mixed when the drum is in position to revolve about a horizontal axis or about an axis which inclines toward its discharge end to an extent to permit a suitably-moderate forward feed while the mixing process is being carried on, and by arranging these shelves to extend longitudinally the batch can be quickly discharged when the drum is suitably tilted.

With further reference to the support for the drum it will be seen that in place of a supporting-frame arranged to swing at one end upon trunnions, as in Letters Patent of the United States to E. H. Taylor, No. 433,663, August 5, 1890, and in place of a tilting frame trunnioned intermediate of its ends, as in said British patent, I provide a drum-support which consists of a double-armed lever having long and short arms and pivoted or fulcrumed between the middle of the drum and its tapered discharge end, and that these two lever-arms carry antifriction-rolls, which engage and support opposite end portions of the drum. The short arm of this lever supports the forward end of the drum, so that when the drum is tilted to discharge the movement of its discharge end will be much less than the movement of its charging or receiving end, and thereby the drum can be set low down and at the same time tilted into position to secure a quick, free, and complete discharge of its contents. With reference to the longitudinal blades arranged as shelves in the drum and extending parallel with the axis of rotation, such devices are particularly effective in a drum such as herein shown and selected from a class of mixers illustrated by Letters Patent of the United States to A. S. Cooper, No. 578,628, March 9, 1897; otherwise the drum may be of any known or desired form suitable for mixing-machines.

What I claim as my invention is—

1. A mixer for concrete and the like, comprising a rotary, tilting mixing-drum having charging and discharge openings respectively at opposite ends and tapered toward its discharge-opening; and a series of straight, longitudinally-disposed flat blades projecting radially inward from the inner wall of the drum and arranged parallel or substantially parallel with the axis of said drum and extending substantially from end to end thereof, whereby the mixing of the material is effected when the drum is rotated, and the material permitted to slide freely toward the contracted discharge-opening when the drum is both rotated and tilted.

2. A mixer for concrete and the like, comprising a rotary mixing-drum having oppositely-arranged charging and discharge openings; a tilting support for the drum; mechanism for rotating the drum; and mechanism for applying the power employed to rotate the drum, to tilt the support for the same.

3. A mixer for concrete and the like, comprising a double-cone-shaped, rotary mixing-drum containing mixing devices; a tilting support for the drum; mechanism for rotating the drum; and mechanism for applying the power employed to rotate the drum to tilt the support for the same.

4. A mixer for concrete and the like, comprising a rotary, tilting mixing-drum having oppositely-arranged charging and discharge openings; power-actuated mechanism for both rotating and tilting the drum; and mechanism for automatically arresting the tilting movement of the drum.

5. A mixer for concrete and other substances, comprising a rotary mixing-drum; a tilting support for the rotary mixing-drum; a rotary driving-shaft; power-transmitting means carried by the tilting support and arranged for driving the drum from the rotary driving-shaft; means for operating the tilting support from the rotary driving-shaft; and means for connecting and disconnecting the power with and from such tilting support.

6. A mixer for concrete and other substances, comprising a rotary mixing-drum; a tilting support for the rotary mixing-drum; power-actuated means for rotating the mixing-drum; power-transmitting means for applying the power to operate the tilting support for the drum; and a clutch mechanism connected with and operated by the tilting support and arranged for disconnecting the power from the tilting support.

7. A concrete mixer comprising a rotary mixing-drum having oppositely-arranged charging and discharge openings, said drum being provided between its said openings with an external ring-gear; a rotary driving-shaft arranged under the drum and transverse to the axis about which the drum revolves; a tilting drum-support forming a double-armed lever which is fulcrumed to tilt about the axis of the rotary driving-shaft; gear connection between the rotary driving-shaft and the gear-ring on the drum; and antifriction-rolls arranged upon the arms of said lever and engaging and supporting opposite end portions of the rotary mixing-drum.

8. A mixer for concrete and the like, comprising a rotary mixing-drum having oppositely-arranged charging and discharge openings, said drum being provided between its said openings with an external ring-gear; a tilting drum-support forming a double-armed lever having long and short arms and fulcrumed between such arms to swing about an axis transverse to the axis about which the drum revolves and located between the middle portion and discharge-opening of the drum; gearing for rotating the drum; and antifriction-rolls arranged upon the arms of said lever and supporting the drum at opposite end portions thereof; the discharge-end portion of the rotary mixing-drum being supported by the short arm of said lever, whereby when the drum is tilted as in dumping, the extent of travel on the part of its discharge end will be less than the extent of travel on the part of its charging end.

9. A mixer for concrete and the like, comprising a rotary mixing-drum having oppositely-arranged charging and discharge openings; a tilting support for the rotary mixing-drum consisting of a double-armed lever pivotally supported to tilt about an axis between its arms; a flexible connection such as a chain or cable connected with the lever-arm at opposite sides of said axis; a winding device for operating the chain or cable; and mechanism for rotating the drum regardless of its position.

10. A mixer for concrete and the like, comprising a rotary drum having oppositely-arranged charging and discharge openings and provided with a ring-gear; a tilting support for the rotary drum; a transversely-arranged driving-shaft arranged under the drum; a counter-shaft 5; and power-transmitting connections between said counter-shaft and the driving-shaft and the ring-gear.

11. A mixer for concrete and the like, comprising a rotary mixing-drum; a base; a tilting support for the rotary mixing-drum fulcrumed between its ends upon the base and arranged to tilt about an axis transverse to the axis about which the drum revolves; a reversibly-operating device for tilting the drum in opposite directions; and connections between such reversibly-operating device and portions of the tilting drum-support at opposite sides of the axis about which said support is arranged to tilt.

WILLIAM J. JUDD.

Witnesses:
EDUARD THOMSEN,
CHRISTIAN THOMSEN.